United States Patent [19]

Siebels

[11] 4,326,865
[45] Apr. 27, 1982

[54] AIR INTAKE UNIT FOR AN INTERNAL COMBUSTION ENGINE

[75] Inventor: Karl-Heinz Siebels, Stuttgart, Fed. Rep. of Germany

[73] Assignee: Daimler-Benz Aktiengesellschaft, Stuttgart, Fed. Rep. of Germany

[21] Appl. No.: 188,674

[22] Filed: Sep. 19, 1980

[30] Foreign Application Priority Data

Sep. 22, 1979 [DE] Fed. Rep. of Germany ....... 2938454

[51] Int. Cl.³ ............................................. B01D 59/50
[52] U.S. Cl. .................................... 55/385 B; 55/413; 55/DIG. 28; 55/307; 123/566
[58] Field of Search ............ 55/DIG. 28, 306, 385 B, 55/414, 418, 413, 307; 98/2.11, 2.14, 2.15, 2.17; 123/566

[56] References Cited

U.S. PATENT DOCUMENTS

| | | | |
|---|---|---|---|
| 3,086,549 | 4/1963 | Fino | 55/434 |
| 3,972,700 | 8/1976 | Gloecker et al. | 55/385 B |
| 3,987,862 | 10/1976 | Lidstone | 55/385 B |

FOREIGN PATENT DOCUMENTS

| | | | |
|---|---|---|---|
| 123307 | 1/1947 | Australia | 55/434 |
| 712542 | 7/1954 | United Kingdom | 55/DIG. 28 |

Primary Examiner—Bernard Nozick
Attorney, Agent, or Firm—Craig and Antonelli

[57] ABSTRACT

An air intake unit for an internal combustion engine, especially for installation in a zone of a roof of a driver's cab of a utility vehicle. The air intake unit includes an approximately square intake box having an inlet port located along a longitudinal side thereof. The inlet port is covered with a perforated plate and an air intake conduit is provided for leading to the internal combustion engine. The intake conduit is connected to an outlet port of the intake box on one end face thereof. And an air baffle is arranged in the intake box in an area of the outlet port for shielding the outlet port with respect to the inlet port. The air baffle is equipped with a plurality of perforations.

8 Claims, 1 Drawing Figure

U.S. Patent    Apr. 27, 1982    4,326,865
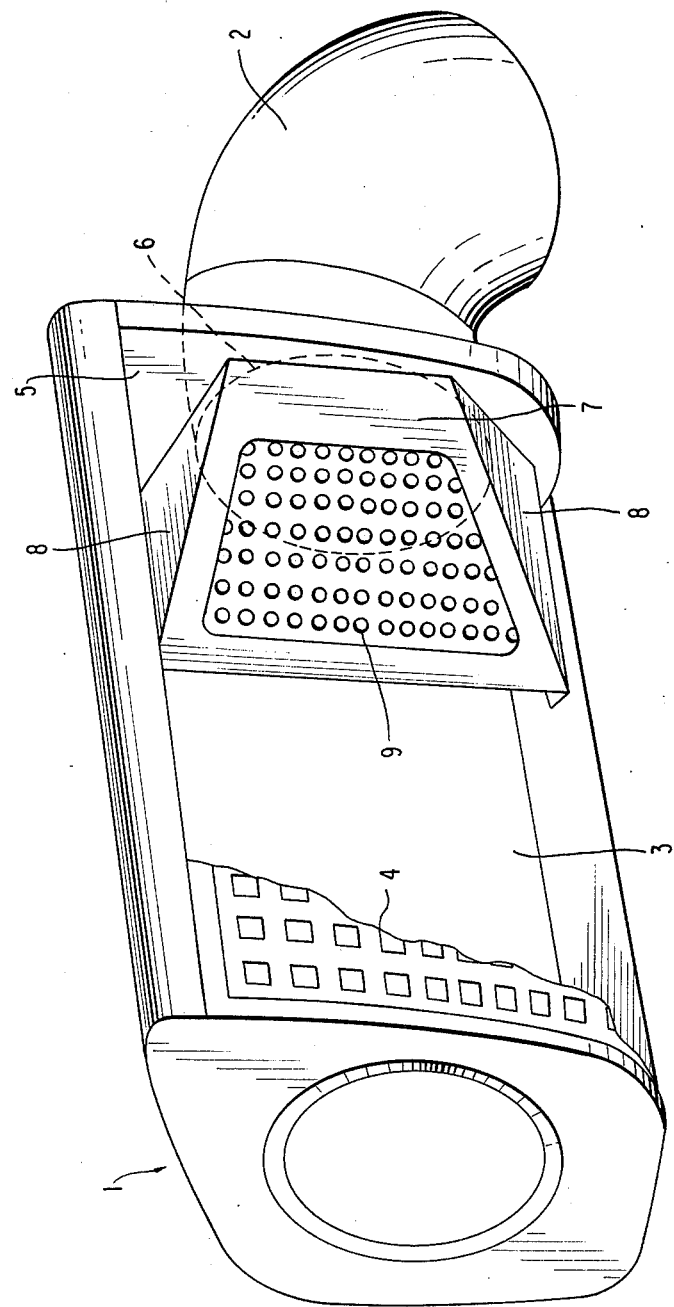

AIR INTAKE UNIT FOR AN INTERNAL COMBUSTION ENGINE

The present invention relates to an air intake unit and, more particularly, to an air intake unit for an internal combustion engine which is adapted to be installed in a zone of a roof of a driver's cab for a utility vehicle, with the unit including approximately square intake box having an inlet port, covered by a perforated plate, located along a longitudinal side of the intake box, an intake conduit leading to the internal combustion engine connected to an output port of the box on one end face, and an air baffle arranged in the box in a zone of the outlet port, which air baffle shields the outlet port with respect to the inlet port. While the air baffle in the aforementioned type air intake unit does prevent the direct entrance into the intake conduit of splash water during, for example, a washing of the vehicle, a disadvantage of the air baffle resides in the fact that the air velocity distribution at the air entrance is impaired so that increased intake of water and dust occurs and an additionally high pressure loss is produced.

The aim underlying the present invention essentially resides in providing an air intake unit for an internal combustion engine which achieves a uniform air velocity distribution over an entire length of an inlet port of the intake unit without the occurrence of pressure losses or without the possibility of a direct entrance of water or the like which may occur during, for example, a washing operation of the vehicle to which the air intake unit is associated.

In accordance with advantageous features of the present invention, an air baffle is provided which includes a plurality of perforations which may be of a circular, quadrangular, slot-like, or gill-like configuration so as to achieve the above-noted aim of the present invention.

In accordance with the present invention, the air baffle may extend almost to one-half of a total length of the inlet port provided at the intake box. Moreover, the air baffle may be extended from an end wall of the intake box at an angle toward the inlet port.

In accordance with a further feature of the present invention, in a zone proximate to an end wall of the intake box, the air baffle may be devoid of any perforations.

In a situation when an intake box is provided wherein upper and lower longitudinal edges defining the inlet port are, as viewed in cross-section, strongly rounded, in accordance with the present invention, the air baffle may be provided with bevels in a zone of the outlet port at the intake box at the top and bottom. Lying tangentially to the outlet port, which bevels extend along an end wall up to one-half of a diameter of the outlet. Advantageously, the bevels of the air baffle may be constructed so as to be devoid of any perforations.

Accordingly, it is an object of the present invention to provide an air intake unit for internal combustion engines which avoids, by simple means, shortcomings and disadvantages encountered in the prior art.

Another object of the present invention resides in providing an air intake unit for an internal combustion engine which prevents a direct entrance of splash water therein while at the same time achieving a uniform air velocity distribution.

A further object of the present invention resides in providing an air intake unit for an internal combustion engine which is simple in construction and therefore relatively inexpensive to manufacture.

These and other objects, features, and advantages of the present invention will become more apparent from the following description when taken in connection with the accompanying drawing which shows, for the purposes of illustration only, one embodiment in accordance with the present invention, and wherein:

The single FIGURE of the drawing is a partial cutaway perspective view of an air intake unit for an internal combustion engine in accordance with the present invention.

Referring now to the single FIGURE of the drawing, according to this figure, an air intake box generally designated by the reference numeral 1 is adapted to be attached to a roof of a driver's cab for a utility motor vehicle such as, for example, a truck, in order to enable the supply of combustion air to a driving engine of the utility vehicle. An air intake conduit or manifold 2 communicates with the internal combustion engine in a conventional manner with the manifold 2 being connected to the intake box 1.

As shown in the drawing, the intake box is of a substantially square configuration with an inlet port being located on one longitudinal side and extending in parallel to a driving direction of the utility vehicle. The inlet port 3 is covered by a perforated plate 4 and the intake conduit or manifold 2 is connected to the intake box 1 on an end face 5 provided with an outlet port 6 having the same cross-section as the intake conduit 2.

An air baffle 7 is arranged in the intake box 1 in a zone of the outlet port 6 for shielding the outlet port 6 with respect to the inlet port 3. The air baffle 7 extends from an end wall 5 to approximately one-half of a length of the inlet port 3 and at an angle with respect to a plane of the inlet port obliquely inwardly up to approximately a center of the outlet port 6. Due to a relatively extensive rounding of the intake box above and below the inlet port 3, the air baffle 7 is provided with bevels 8 which extend in a zone of the end wall 5 approximately tangentially toward the outlet port 6 and up to a center of the outlet port 6. The bevels 8 are firmly joined to the lower and upper walls of the intake box 1.

While the bevelled portions 8 are not provided with perforations, advantageously, the air baffle 7 is provided with perforations 9 extending from a free edge of the air baffle 7 over about two-thirds of a total length of the air baffle 7.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. An air intake unit for an internal combustion engine, the air intake unit being adapted to be installed in an area of a driver's cab of a utility vehicle, the air intake unit comprising an intake box having an inlet port along a longitudinal side thereof, a perforated plate for covering the inlet port, an outlet port connected to an intake conduit, the intake conduit being adapted to be connected to an internal combustion engine, and air baffle means arranged in the intake box in an area of the outlet port for shielding the outlet port with respect to the inlet port, characterized in that the air baffle means is provided with a plurality of perforations.

2. An air intake unit according to claim 1, characterized in that the air baffle means extends up to about one-half a total length of the inlet port of the intake box.

3. An air intake unit according to claim 2, characterized in that the air baffle means extends from an end wall of the intake box at an angle with respect to a plane disposed in the inlet port.

4. An air intake unit according to claim 3, characterized in that an area of the air baffle means in proximity to the end wall of the intake box is imperforate.

5. An air intake unit according to one of claims 1, 2, 3, or 4, characterized in that lower and upper longitudinal edges defining the inlet port have a round cross-sectional configuration, the air baffle means includes bevelled portions and the top and bottom therof in an area of the outlet port, and in that the bevelled portions are disposed tangentially to the outlet port and extend from an end wall of the intake box up to a center of the outlet port.

6. An air intake unit according to claim 5, characterized in that the bevelled portions are imperforate.

7. An air intake unit according to claim 6, characterized in that the intake box has an approximately square configuration.

8. An air intake unit according to claim 7, characterized in that the plurality of perforations are provided over about two-thirds of a total length of the air baffle means.

* * * * *